(12) United States Patent
Larsson et al.

(10) Patent No.: US 7,266,126 B1
(45) Date of Patent: Sep. 4, 2007

(54) TELESYSTEM WITH COUPLING DEVICE AND A METHOD IN CONNECTION THEREWITH

(75) Inventors: Gunnar Larsson, Tumba (SE); Patrik Wiss, Stockholm (SE); Lars-Göran Petersen, Tumba (SE); Ulf Ekstedt, Saltsjöbaden (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 954 days.

(21) Appl. No.: 10/311,788

(22) PCT Filed: Jul. 5, 2000

(86) PCT No.: PCT/SE00/01432

§ 371 (c)(1),
(2), (4) Date: Feb. 28, 2003

(87) PCT Pub. No.: WO02/03673

PCT Pub. Date: Jan. 10, 2002

(51) Int. Cl.
*H04M 11/08* (2006.01)
*H03K 17/80* (2006.01)

(52) U.S. Cl. .................. 370/401; 370/408; 370/351
(58) Field of Classification Search .............. 370/401, 370/408, 351; 455/349, 161.2; 379/93.07, 379/100.12
See application file for complete search history.

(56) References Cited

U.S. PATENT DOCUMENTS

| | | | |
|---|---|---|---|
| 5,089,885 A | 2/1992 | Clark | 358/86 |
| 5,136,581 A | 8/1992 | Muehrcke | 370/62 |
| 6,009,507 A * | 12/1999 | Brooks et al. | 712/28 |
| 6,266,342 B1 * | 7/2001 | Stacey et al. | 370/465 |
| 6,421,429 B1 * | 7/2002 | Merritt et al. | 379/93.17 |
| 6,549,945 B1 * | 4/2003 | Sinibaldi et al. | 709/226 |

FOREIGN PATENT DOCUMENTS

| | | |
|---|---|---|
| EP | 0 877 499 A2 | 11/1998 |
| GB | 2 337 429 A | 11/1999 |
| WO | WO99/17575 | 4/1999 |
| WO | WO99/52307 | 10/1999 |
| WO | WO 00/04717 | 1/2000 |

* cited by examiner

*Primary Examiner*—Hassan Kizou
*Assistant Examiner*—Mounir Moutouakil

(57) ABSTRACT

The present invention refers to a gateway (MGW1) in a telecommunication system (TS1) enabling connections to be effectively established between various networks (N1, N2, N3) in the telecommunication system. The gateway comprises resources from different nodes (RNC1, MSC1, IP1, VX1) of the various networks. Servers (S1-S6) from the networks are connected to the gateway (MGW1) and co-utilize the resources, which contributes to the effective utilization of the resources. This effective utilization of the resources is supported by the resources being divided into resource groups. Specific ones of these resource groups can be utilized by solely each one of the servers. Consequently, important services such as alarm services and security services can always reach the necessary resources in the gateway. Other resource groups can be co-utilized by only a small number of the servers while additional resource groups may be co-utilized by all of the servers (S1-6). By division into the resource groups the resources of the nodes (RNC1, MSC1, IP1, VX1) are co-utilized without the establishing of specific significant connections having to be rejected.

12 Claims, 8 Drawing Sheets

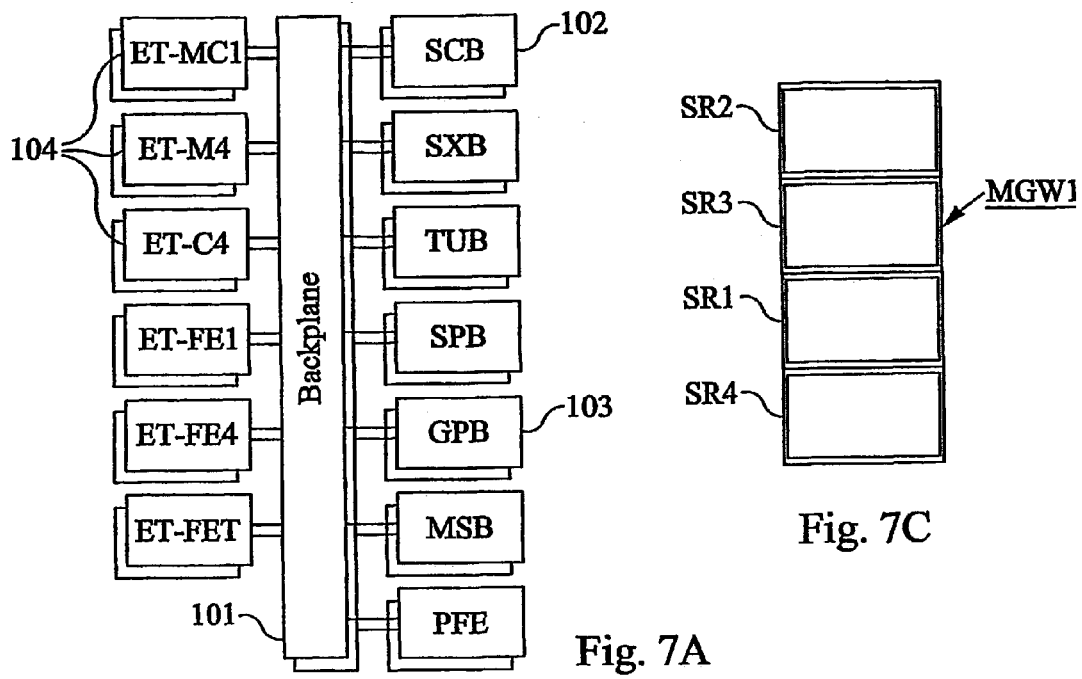
Fig. 7A
Fig. 7C
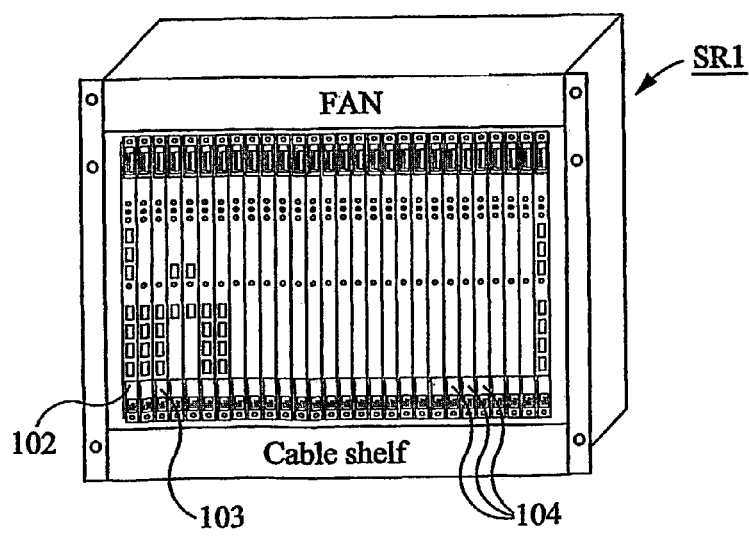
Fig. 7B

TELESYSTEM WITH COUPLING DEVICE AND A METHOD IN CONNECTION THEREWITH

TECHNICAL FIELD

The present invention refers to a telecommunication system with an arrangement for handling resources in the telecommunication system, said resources being intended for establishing a connection, and a process associated therewith.

DESCRIPTION OF RELATED ART

Telecommunication systems which are composed of several different types of telecommunication networks have been created. The networks can be connected both as circuits and as packets and can have different types of signal formats. The networks, including the ones that are packet connected, can transfer information in real time and in certain cases offer high quality in the services that they provide, for example high accessibility, good audibility and unbroken communication. However, it is expensive for the operators to manage the networks if the requirement of high quality is to be retained. These costs can be decreased if existing telecommunication networks are replaced by an entirely novel packet-connected network. On the other hand this would cause capital destruction. Efforts have therefore been made to interconnect specific networks while retaining high quality in the services. One problem in this regard is that the networks generally have limited resources for establishing connections and a problem coherent with this is to distribute these limited resources between various users of the telecommunication system.

British Patent Application GB 2337429A discloses an IP network with an IP router which serves a number of private networks. Each network has its respective control equipment. The IP router has access to a limited resource as an intermediary of data packets, and this resource is split up and distributed in the control equipment in the various private networks. Particularly, the router ensures that no control equipment exceeds the resources that have been assigned to it for acting as a packet intermediary.

International Patent Application WO99/17575 discloses the distribution of data transmission resources in a telecommunication system. In a first step the transmission resources are divided between various networks in the telecommunication system. In a second step the channels in each network are distributed between different users. The networks are ensured a specific minimum resource, and additional resources can be assigned to the networks from a resource bank or from other networks which have been provided with too large resources earlier.

International Patent Application No. WO99/52307 discloses a mobile telephone system which is connected to external telecommunication networks. In the mobile system resources on the one hand in the form of radio channels for communication with mobile phones and on the other hand in the form of channels to the external telecommunication networks are assigned, and the two types of channels are linked together. The linking is based on a number of parameters which describe the transmission quality and the existing traffic situation.

U.S. Pat. No. 5,136,581 discloses assigning limited common resources in a telecommunication network. The resources are transmission resources which a customer requests to utilize in the telecommunication network. The resources are divided for various users by the customer and the utilization is restricted by the users being allotted connecting and disconnecting periods.

The known technology disclosed above shows how resources in a telecommunication network or a node are assigned to or distributed among users of the network. The solutions show effective methods of handling the resources, but each solution only considers a specific type of resource or a limited portion of the total resources in a node. Telecommunication systems most frequently comprise a plurality of nodes, and in telecommunication networks where many different users have to utilize a plurality of different types of resources difficulties in this utilization arise, i.a. in the form of a competitive situation with regard to the resources. No consideration of how to handle a competitive situation of this type has been given earlier.

SUMMARY OF THE INVENTION

The present invention tackles the problem of utilizing the total amount of internal resources in nodes in a telecommunication system in an effective manner for handling the connections in the various networks of the system.

A partial problem which is tackled is the manner in which the total number of internal resources in the nodes of the telecommunication system are to be distributed between various users of the resources so as to support effective utilization of the resources.

Another partial problem that is tackled is to make certain that users that demand a predetermined portion of the internal resources also are provided with these resources.

Briefly, the problem is solved by resources from different nodes in the telecommunication system being co-utilized by users in the system. The partial problem of distributing the resources is solved by lending the resources different accessibilities, which also makes it possible to reserve some of the resources for specific ones of the users.

Somewhat more specifically the problem is solved by dividing at least one portion of the telecommunication system into two levels. Units for controlling the mentioned one portion of the telecommunication system, mainly servers, are placed in a control level. The nodes with internal functions which are included in the actual connections are assigned to a user level and these collected nodes are considered to be a closely connected unit. The servers in the control level are considered to be the users of the telecommunication system. By addressing, they have access to the nodes of the user level and the functions of said nodes which are considered to be internal resources in the gateway of the telecommunication system. In one embodiment of the invention the resources are allotted different accessibilities, and in a variant the resources are divided into classes which address the availability. These classes are utilized in distributing the resources, and they guarantee specific ones of the users access to a portion of the resources whereas they indicate restrictions of how other users can make use of the resources.

One object of the present invention is to collect a portion of the resources in the nodes of the telecommunication system into one single unit and to let the users co-utilize these resources. The resources comprise internal resources in the nodes, and the co-utilization creates improved utilization of these resources.

Another object is to let the collected unit be utilized by different networks in the telecommunication system.

Still another object is to distribute the internal resources of the collected unit between various users of the resources in a predetermined manner so as to improve the utilization of resources additionally.

A further object is to ensure that any one of the users of the collected unit who demands it always has access to a specific part of the resources.

An advantage of the invention is that the collected resources in a portion of a telecommunication system are utilized by a plurality of users, whereby a higher degree of utilization is achieved.

Another advantage is that the collected internal resources in the unit can be utilized by different networks in the telecommunication system.

Still another advantage is that the resources can be distributed in a predetermined manner and that certain ones of the users can be guaranteed access to a specific portion of the resources.

The invention will now be described more specifically by means of preferred embodiments and with reference to the enclosed Figures.

DESCRIPTION OF THE DRAWINGS

FIG. 7A shows a block diagram of the gateway with its circuit board;

FIGS. 7B and 7C, respectively, show views of the structure of the gateway and its subrack and circuit board;

PREFERRED EMBODIMENTS

Figure 1:
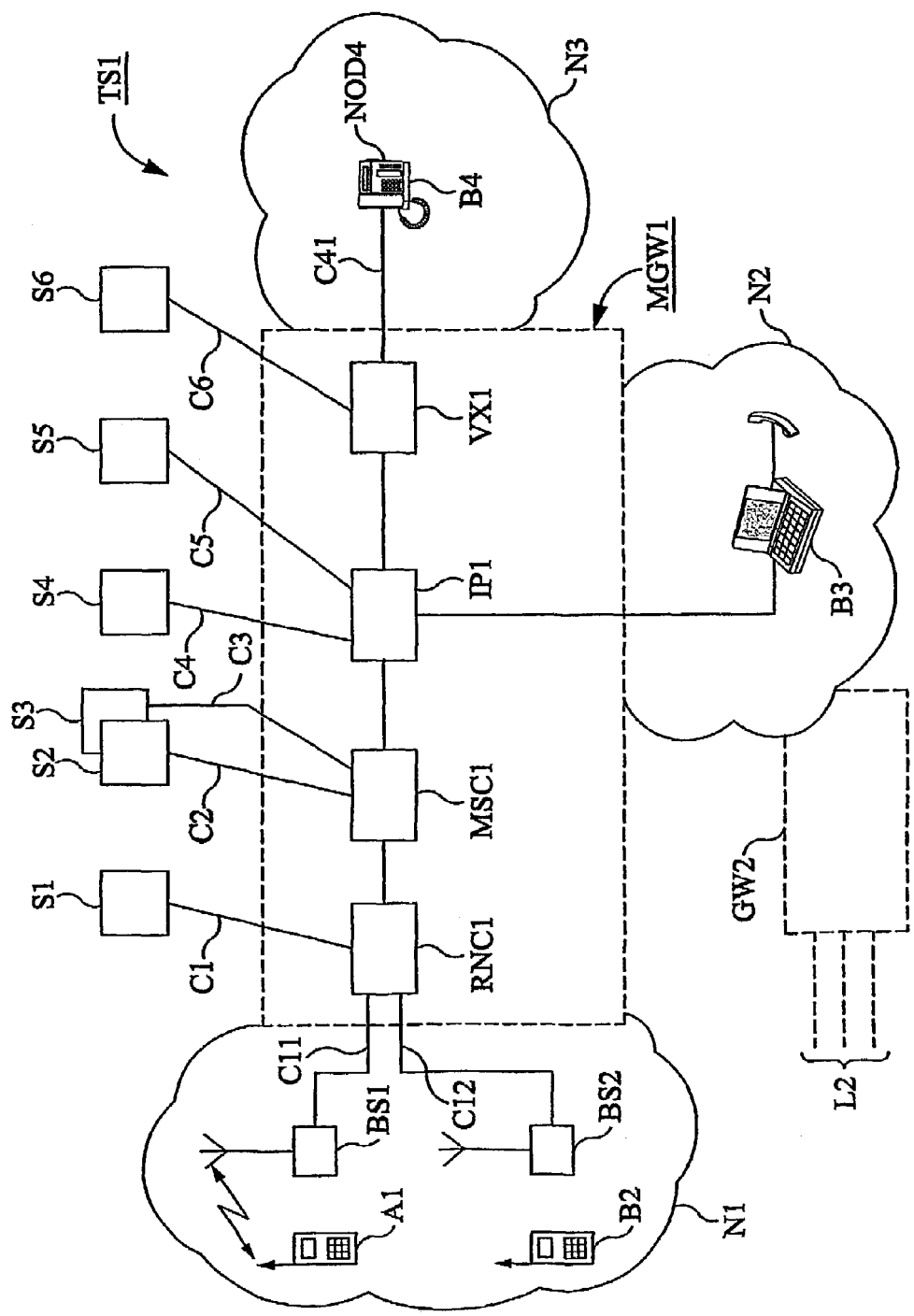
FIG. 1 shows a view of a telecommunication system.

FIG. 1 shows a view of a portion of a telecommunication system TS1 which comprises networks of various types, in this example a mobile telecommunication network N1, an IP network N2 and a circuit switched telephone network N3. Networks N1, N2 and N3 are interconnected by a switching node for switching the connections, i.e. a gateway MGW1. The latter comprises a plurality of logic nodes which are defined by their respective networks, i.e. in the example a mobile switching station MSC1, a control unit RNC1 for a radio network, an IP router IP1, and a telephone exchange VX1. Gateway MGW1 is controlled by a number of servers, of which a first server S1 is connected to control unit RNC1, a second server S2 and a third server S3 are connected to mobile switching station MSC1, a fourth server S4 and a fifth server S5 are connected to IP router Ip1 and a sixth server S6 is connected to exchange VX1. The servers are structured in consideration of the various networks and are connected through the respective connections C1-C6 as shown in the Figure. Mobile telecommunication network N1 has two base stations BS1 and BS2 which are connected to control unit CNC1 through the respective connectors C11 and C12, respectively. A first subscriber A1 with a mobile phone can establish a connection through base station BS1 and a second subscriber B2 utilizes base station BS2. IP network N2 includes a third subscriber B3 with a computer and a computer phone, and in telephone network N3 a fourth subscriber B4 with a circuit switched telephone set is connected to the gateway via a terminal C41. The subscribers can be connected to each other by means of gateway MGW1. The Figure also schematically shows an additional unit GW2 with connections L2, said unit being connected to network N2. This indicates that the nodes and the servers which are shown in the Figure solely comprise part of the total telecommunications network TS1.

In traditional telecommunication systems control unit RNC1, mobile connecting station MSC1, router IP1 and exchange VX1 substantially have their own servers which control the respective nodes. Contrary to this, in the present description, the telecommunication system the servers of the various nodes are from the point of logic referred to a control level, with control unit RNC1, mobile connecting station MSC1, IP router IP1 and exchange VX1 being referred to a user level. Each one of the nodes in the user level has resource units with resources which are utilized in establishing connections between subscribers A1, B2, B3 and B4. Servers S1-S6 can utilize at least part of the resources from the various nodes in the user level, and the nodes of the user level are therefore from a logical point of view associated with gateway MGW1 as shown by a dashed frame in the Figure.

As mentioned earlier, the various subscribers can establish connections with each other via gateway MGW1. Networks N1, N2 and N3 in which the subscribers are located have signal formats differing from each other. In the units of the user level gateway MGW1 has switch and trunk functions corresponding to these signal formats, said functions being necessary in order to establish connections. In addition, gateway MGW1, also in the units of the user level, has telefunctions which must be capable of being supplied to the connection. Examples of such functions are codecs for connections with mobile phones or for multimedia applications, echo cancellers, ringing tone functions for permanent telephony, conference functions which can be utilized in all networks, voice mail, and additional functions. Both the switch and trunk functions and the telefunctions are internal resources in the gateway. In addition to these resources the gateway has further resources such as internal transmission resources and internal processor resources which are utilized when the switch and trunk functions and the telefunctions are to be executed.

Figure 2:
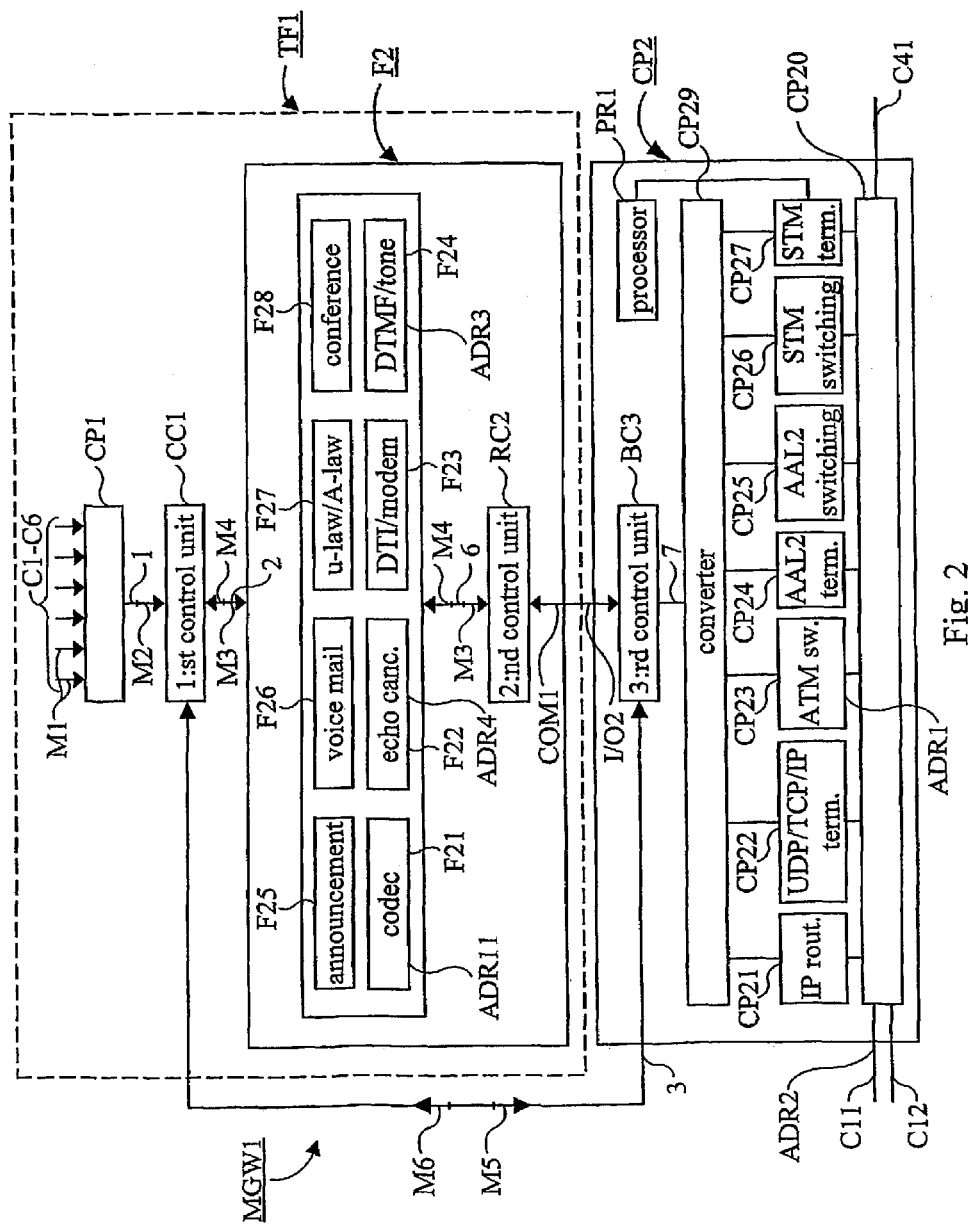
FIG. 2 shows a block diagram of a gateway.

With reference to FIG. 2 the structure of gateway MGW1 will now be disclosed more specifically. The gateway has two main portions, one telefunction portion TF1 and one interface box CP2, both having devices for establishing connections. The telefunction portion comprises a function box F2 which has resource units with telefunctions F21-F28 which are utilized for telecommunication connections. In the example, function F21 is a codec, function F22 is an echo canceller, function F23 is a modem, function F24 generates a tone signal which creates a ringing signal of a subscriber, function F25 is a message function that generates spoken standard messages, function F26 enables a subscriber to record a voice message, function F27 converts from digital u-law to A-law, and function F28 handles conference connections. Telefunction portion TF1 also comprises a signal handling unit CP1 which is connected to servers s1-S6 via connections C1-C6 and a first control unit CC1 to control establishing a connection internally in gateway MGW1. The first control unit CC1 is connected on the one hand to signal handling unit CP1 via an interface 1 and on the other hand to function box F2 via an interface 2. Function box F2 has a second control unit RC2 which is connected to telefunctions F21-F28 through an interface 6 and which controls the allotment of the resources in these telefunctions.

Interface box CP2 comprises a physical line interface CP20 which has external connectors C11, C12, and C41. Box CP2 includes a signal format converter CP29 which has resource units with switch and trunk functions CP21-CP27 for handling various signal formats of signals which are exchanged via the external connectors. Box CP2 also has a third control unit BC3 which is connected on the one hand to signal format converter CP29 through an interface 7 and on the other hand to the second control unit RC2 via an interface I/O2 and which also is connected to the first control unit CC1 through an interface 3. In this embodiment interface box CP2 has the following switch and trunk functions. Function CP21 is an IP router, function CP22 terminates IP, TCP and UDP, function CP23 connects ATM cells, function CP24 terminates AAL2 (ATM adaption layer type 2), function CP25 connects AAL2 packets, function CP26 connects STM channels and function CP27 terminates STM channels. Both switch and trunk functions CP21-CP27 and telefunctions F21-F28 are functions which are intended to be included in telecommunication connections which are established between networks N1, N2 and N3 as will be explained in the following description.

The functions and control units mentioned above are positioned on circuit boards as will be described below with regard to FIGS. 7A, 7B and 7C, respectively. These circuit boards have processors which cooperate in handling the units which are located on the board. FIG. 2 shows an example of such processor PR1 which is connected to function CP27.

The portions of gateway MG1 mentioned above have the following functions:

Signal processing unit CP1 exchanges signals generally designated M1 with servers S1-S6 via connections C1-C6. The unit handles i.a. security and authority functions, confirms that messages have been received, records incoming and outgoing messages and notifies the server of when status changes in the gateway have occurred. Signal M1 has two portions, one portion as an address header and a second portion with the actual contents, the so-called payload, which is divided into different packets. Signal processing unit CP1 detaches the address header of a received signal and sends the portions of the packets intended for this further on to the first control unit CC1 via interface 1.

The first control unit CC1 receives the signal packets, i.e. a signal M2, from signal processing unit CP1 and on the basis thereof requests the necessary ones of telefunctions F21-F28. The first control unit activates or deactivates external connections as may be seen from signal M2 and activates or deactivates internal connections between the telefunctions and the ends of the external connectors.

The second control unit RC2 handles the telefunctions F21-F28 which have been mentioned earlier. The second control unit has information on how may editions of a specific telefunction are available and where the functions are located, i.e. the control unit has the function addresses of the telefunctions. By a signal M3 the first control unit CC1 requests one of the telefunctions of the second control unit. The second control unit delivers a message M4 with a function address of the telefunction to the first control unit, including information on the location of the function.

As may be seen from the description above telefunction portion TF1 has the two internal interfaces 1 and 2. The purpose of interface 1 is to separate the reception and processing of message M1 from the operations created by the message. By means of interface 2 the first control unit CC1 can reserve telefunctions F21-F28 for a connection or release them when they no longer are needed for the connection.

In interface box CP2 line interface CP20 has different types of physical interfaces with varying transmission speeds, for example 1.5, 2, 6.3, 8, 34, 155, or 256 Mbps. The third control unit BC3 can perform the functions of connecting signal format converter CP29 and the switch and trunk functions, of connecting one or more of the telefunctions, and of finding an available outgoing partial connection to the next node in the connection and of establishing it. In order to perform this, the third control unit receives a signal M5 from the first control unit with information on the incoming connection and on the function address for the telefunction which is to be connected. Signal M5 can also contain information on a node to which a partial connection is to be created as a continuation of the incoming connection. The third control unit BC3 delivers a signal M6 to the first control unit CC1 which i.a. can contain information on the connection that has been established to the next node. Signal format converter CP29 with switch functions CP21-CP28 converts incoming signal formats to a common signal format COM1 and also reconverts from this format to an outgoing signal format for the established connection to the next node.

A significant characteristic of gateway MGW1 is that it can establish connections between arbitrary types of telecommunication networks and in so doing can be controlled by one or more servers in one or more of the networks. The gateway has internal resources with functions included in the telecommunication connections in the various networks and also internal transmission and processor resources for handling the functions. The servers co-utilize the resources and can in one embodiment reach all of the internal resources irrespective of the type of network to which the resources belong. In another embodiment certain ones of the servers are ensured access to a specific portion of the resources, whereby restrictions are given as to how the remaining servers can utilize these resources. The telefunctions in function box F2 are unchanged and independent of the network to which the gateway is connected. New functions can be added, but the functions are to be unchanged per se over time. Another characteristic of the gateway is that any desired new telecommunication networks can be connected by means of the gateway, and furthermore new switch and trunk functions can be added. The telefunctions and the switch and trunk functions can be stored in the form of hardware or software and can be stored anywhere within their respective boxes. The gateway can also easily be expanded so as to achieve increased capacity.

Gateway MGW1 utilizes the fact that the signals on connector C11 or C12 are connected to their respective switch functions CP21-CP27 and thereafter are converted to the common signal format COM1 in converter CP29. The latter thereupon converts the signals to a signal format which is adapted to the one of the switch and trunk functions CP21-CP27 which is utilized when the signal is to be forwarded on a partial connection to the next node via connector C41. Between these two conversions one or more of telefunctions F21-F28 can be connected via connector I/O2 if it is necessary for the connection. Furthermore an established ongoing connection between two subscribers can be broken up and one or more additional telefunctions can be added. Examples of functions that are added are the conference function F28 for connecting additional subscribers in the connection of function F25 with standard messages. All of the telefunctions operate on the common signal format COM1 which is the format that the signals have at connector I/O2. When a connection is established via gateway MGW1 it may occur that none of the telefunctions in function box F2 has to be connected. However, the transmitted signals have different formats at the input and at the output, and, as has been mentioned above, the incoming signal is converted to the common signal format in converter CP29 for being reconverted to the outgoing signal format. Among the switch and trunk functions CP21-CP27 the routing and connection functions can also be used directly when the incoming traffic is of the same format as the outgoing traffic and no telephony functions are to be utilized. In this case gateway MG1 acts as a pure switch or router, respectively, i.e. the traffic is connected directly from a physical/logical input to a physical/logical output. "Logical" here indicates an input/output for as an example the virtual channels offered by ATM. As an example incoming IP traffic which is to be routed directly to an output of the gateway can be mentioned. The traffic enters over line interface CP20 to switch function CP23 for ATM switching and is routed there to an output and leaves via line interface CP20 again.

The common signal format COM1 can be a format which is known in the relevant area of technology. An example of this is the packet oriented format AAL2, in which the designation AAL2 stands for ATM Adaption Layer type 2.

An overview of the hardware design of gateway MGW1 will be given with reference to FIGS. 7A, 7B and 7C. FIG. 7A shows the structure of the hardware in a subrack. The latter has a backplane 101 to which various circuit boards are connected. A board with an exchange core 102 (SCB Switch Core Board), a main board 103 with a main processor (GBP General Purpose Board) or a board 104 having the above-mentioned telefunctions F21-F28 can be mentioned as examples of the circuit boards. The boards are in conventional manner slipped into a receptacle SR1 as shown in FIG. 7B, with the reverse side of said receptacle containing the backplane 101. Gateway MGW1 is comprised of various receptacles SR1, SR2, SR3 and SR4 which are gathered into a unit as shown in FIG. 7C and whose backplanes are connected to each other.

Gateway MGW1 is structured as has been described with reference to FIG. 1, FIG. 2 and FIGS. 7A, 7B and 7C, respectively. The gateway has both the internal telecommunication functions and the internal trunk and switch functions which are determined by the various types of networks to which the gateway is connected. Certain of these functions are used solely for one of the networks, for example codec F21 particularly intended for being connected to a mobile telephone network. Other functions can be used in connections to many different types of networks, for example function F26 for voice mail or conference function F28. Servers S1-S6 which belong to a respective type of network can all utilize these gathered internal resources in the form of functions F21-F28 and CP21-CP27, respectively, although in some situations it may be appropriate to introduce precedence for certain users and restrictions for others as will be described below. In addition to the resources now mentioned, gateway MGW1 also has internal transmission and processor resources which can be used by various networks in the manner described above and which are exemplified by processor PR1.

Figure 3:
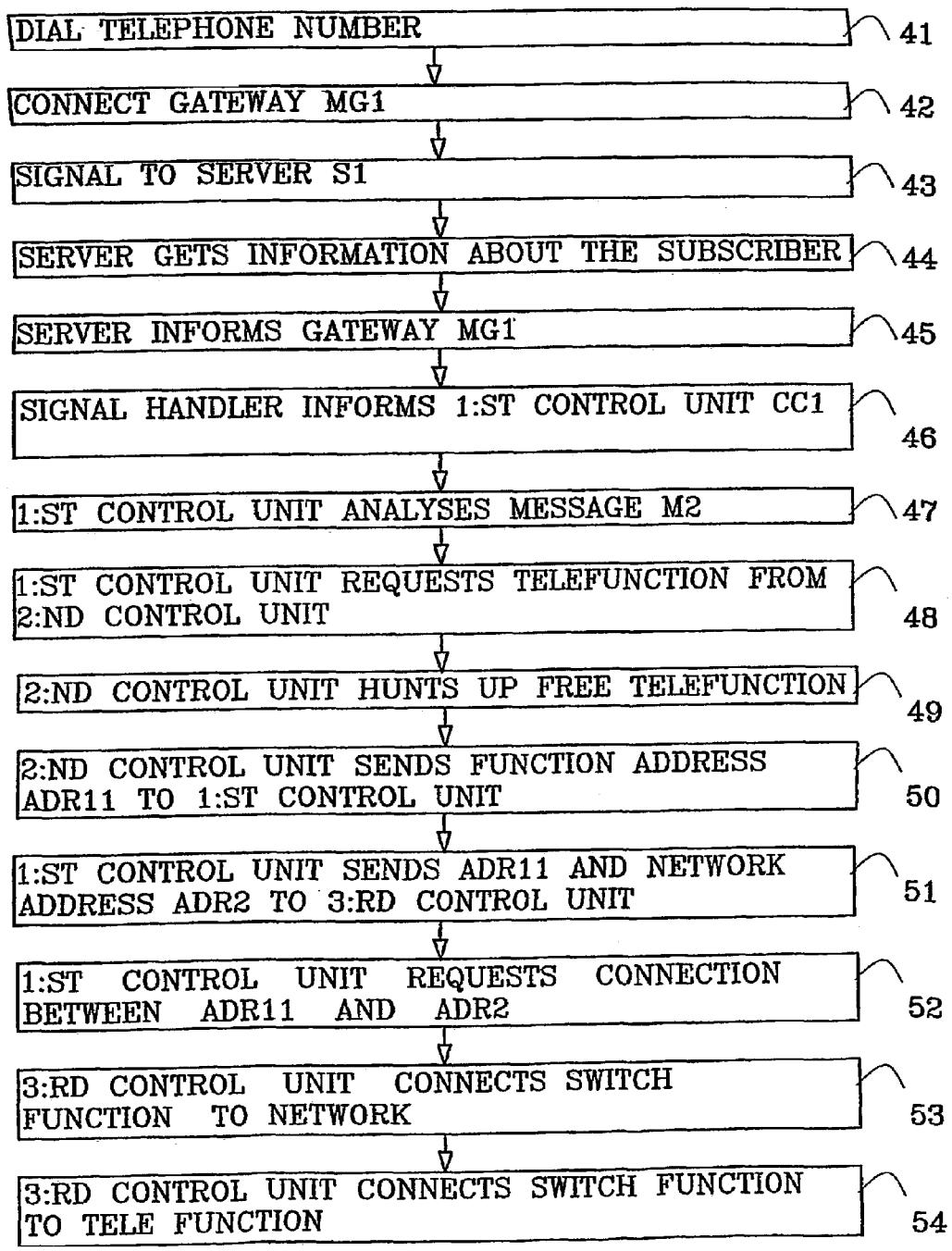
FIG. 3 shows a flow chart for establishing a connection.
Figure 4:
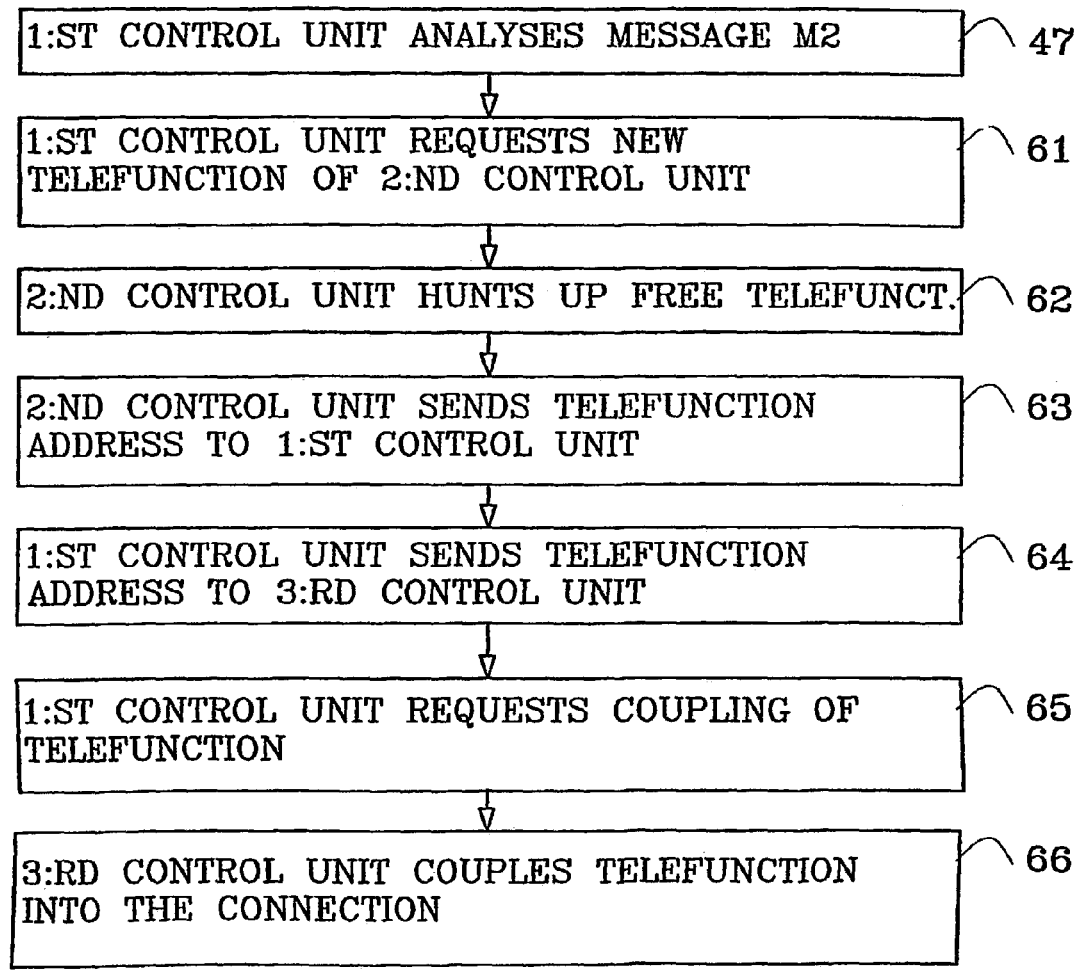
FIG. 4 shows a flow chart for connecting a telefunction in the connection of FIG. 3.

With reference to FIGS. 3 and 4 a more specific explanation of the manner in which gateway MGW1 functions will be given by means of several embodiments.

Establishing a Connection from Subscriber A1 to Gateway MGW1

With reference to FIG. 1 it was mentioned by way of introduction that the two subscribers A1 and B4 can be interconnected so that they can carry on a conversation. A first portion of this connection is a request for a call from subscriber A1, establishing the connection to gateway MGW1 with a signal converter, and introducing at least one of the telefunctions. FIG. 3 shows a flow chart of this first portion of the connection.

Subscriber A1 dials the phone number to the telephone set of subscriber B4 in conventional manner on his mobile phone as indicated in box 41 and is connected to gateway MGW1 via base station BS1 over connector C11 as indicated in box 42. Signaling from subscriber A1 is established over connection C2 to server S2, box 43. This server senses the signal format of subscriber A1, in this case compressed speech, and also senses that network N1 is an ATM network, all of which is indicated in box 44. In calling from subscriber A1 the server is provided with specific information concerning subscriber B4 so that the server can determine the node address for the next node which is to be connected. In this manner server S2 has the information that is needed to interconnect subscribers A1 and B4. Over connection C2 the server transmits control signals in the form of message M1 to gateway MGW1 and more specifically to signal processing unit CP1 as indicated in box 45. Message M1 is a standard protocol which has an address header with a destination address and an information portion divided into different data packets. The server's own identity, its address, is also included in message M1. Signal processing unit CP1 separates the address header and sends the information portion of the control signals with message M2 to the first control unit CC1 as indicated in box 46. This information portion is analyzed by the first control unit i.a. with regard to information on which telefunctions are required and information on the signal format and network address ADR2 for the connection from subscriber A1, all of this as indicated in box 47. With message M3 the first control unit CC1 sends a request to the second control unit RC2 for one of the telefunctions, box 48. The mobile phone of subscriber A1 sends coded speech which must be decoded in order to be understood in the telephone set of subscriber B4. Thus, message M3 contains a request for telefunction F21 with a codec function. The second control unit RC2 hunts up a free telefunction among these functions as indicated in box 49 and sends its function address ADR11 with message M4 to the first control unit CC1 as indicated in box 50. Now the first control unit sends the function address ADR11 for the free function F21 together with message M5 and network address ADR2 for the incoming connection to the third control unit BC3 as indicated in box 51. Together with message M5 the first control unit also sends a request to the third control unit to connect network address ADR2 to address ADR11 for the chosen, free codec function F21 as indicated in box 52. As indicated in box 53 the third control unit BC3 connects the one of switch and trunk functions which corresponds to network address ADR2, in this example function CP23 for ATM switching with the address ADR1. Function CP23 is interconnected with telefunction F21 as indicated in box 54. A speech signal TS1 which arrives later on connector C11 from subscriber A1 can thus be received by switch function CP23 and transformed to the common signal format COM1 in signal format converter CP29. Speech signal TS1 can be decoded via telefunction F21 which operates in the common signal format prior to this speech signal being connected further.

Connecting Additional Telefunctions in Gateway MG1

In the example given above only one of the telefunctions is connected, i.e. the codec function F21. Several telefunctions must be connected frequently and this is the case also here. Telephone B4 must have a ringing signal, and furthermore echoes can occur in the connection. Tone generating function F24 and echo canceller F22 will therefore also have to be connected.

When subscriber A1 initiated the call, server S2 received a message concerning the called subscriber B4. The server will thereby have information about the node address NOD4 of subscriber B4 and will know that the subscriber requires a ringing signal and echo cancellation. This information was forwarded to gateway MGW1 with message M1 and further with message M2 and was analyzed in the first control unit CC1. With reference to the flow chart of FIG. 4 a description will now be given of the manner in which additional telefunctions are introduced into the connection.

As indicated in box 47 in FIG. 3 the first control unit CC1 analyzes message M2. This control unit now requests, as indicated in box 61, a new telefunction of the second control unit RC2 with message M3. This second telefunction is telefunction F24 for tone generating in accordance with the example. The second control unit hunts up a free telefunction as indicated in box 62 and, as indicated in box 63, sends the function address ADR3 of telefunction F24 with message M4 to the first control unit CC1. This control unit sends the function address ADR3 of telefunction F24 with message M5 to the third control unit BC3 as indicated in box 64 and also sends a request for coupling telefunction F24 in the connection as indicated in box 65. As indicated in box 66 the third control unit BC3 couples this telefunction into the connection which as indicated above is in a state in which it already has been converted into the common signal format COM1. The first control unit continues the analysis of message M2, and the process of FIG. 3 is repeated if further telefunctions are to be connected. This is the case in this example, in which telefunction F22 for echo cancellation with the function address ADR4 is coupled into the connection when it is in the common signal format COM1.

It should be noted that the process of connecting in gateway MGW1 is the same as the one that has been described in the two examples given above, even if the incoming connection on terminal C1 should happen to come from another node than base station BS1 with the address NOD2. An example of such alternative node is another gateway. Switch and trunk functions and telefunctions can need to be chosen differently, but the connecting procedure itself is unaltered. It should be noted that the resources for a conversation can be distributed on additional coupling nodes further to gateway MGW1. An example of this is when a mobile phone call from subscriber A1 is established through a plurality of connecting nodes. The call can then be transferred in its coded compressed form to the last one of the connecting nodes to which a called subscriber having a circuit switched telephone set is connected. It is in this last connecting node that a codec corresponding to codec F21 is connected. The manner of utilizing resources for a connection from various connecting nodes is determined by the servers in the control plane.

A description of the structure of gateway MGW1 and the manner in which it is connected to servers S1-S6 has been given with reference to FIGS. 1, 2 and 7A-7C, respectively. FIGS. 3 and 4 and their descriptions provide examples of the manner in which the gateway is utilized for establishing connections under the control of server S2. Other very similar examples can be described, in which connections are established by means of the other servers. Resources in the form of switch and trunk functions CP21-CP27 and telefunctions F21-F28 are shown gathered in units F2 and CP2 in FIG. 2. A portion of the transmission and processor resources of gateway MGW1 is also shown by processor PR1 and the three control units CC1, RC2 and BC3 and their connections. These resources are originally associated with the various nodes RNC1, MSC1, IP1 and VX1 in FIG. 1. The examples show how the collected resources in gateway MGW1 can be co-utilized by servers S1-S6 by means of addressing. In these examples the locations of the resources are of lesser interest, they can always be reached by their addresses, and the various servers can request resources independently of each other.

In the mentioned examples it has been presupposed that server S2 has access to all functions F21-F25 and CP21-CP27, respectively, and that all of the servers S1-S6 can reach all functions equally well. However, in specific cases it may be appropriate to let the various servers have access differently to various resources in gateway MGW1. For example, this can concern security and alarm services which must be able to be utilized or a telecommunications operator who will ensure its customers of specific services. In an embodiment of the present invention distribution of resources of this type is carried out by classifying the resources in the three following classes:

Dedicated resources. Only one of the servers can reach a specific group of these resources.

Divided resources. Only a few of the servers can reach a specific group of these resources.

Common resources. All servers can reach these resources.

Figure 5:
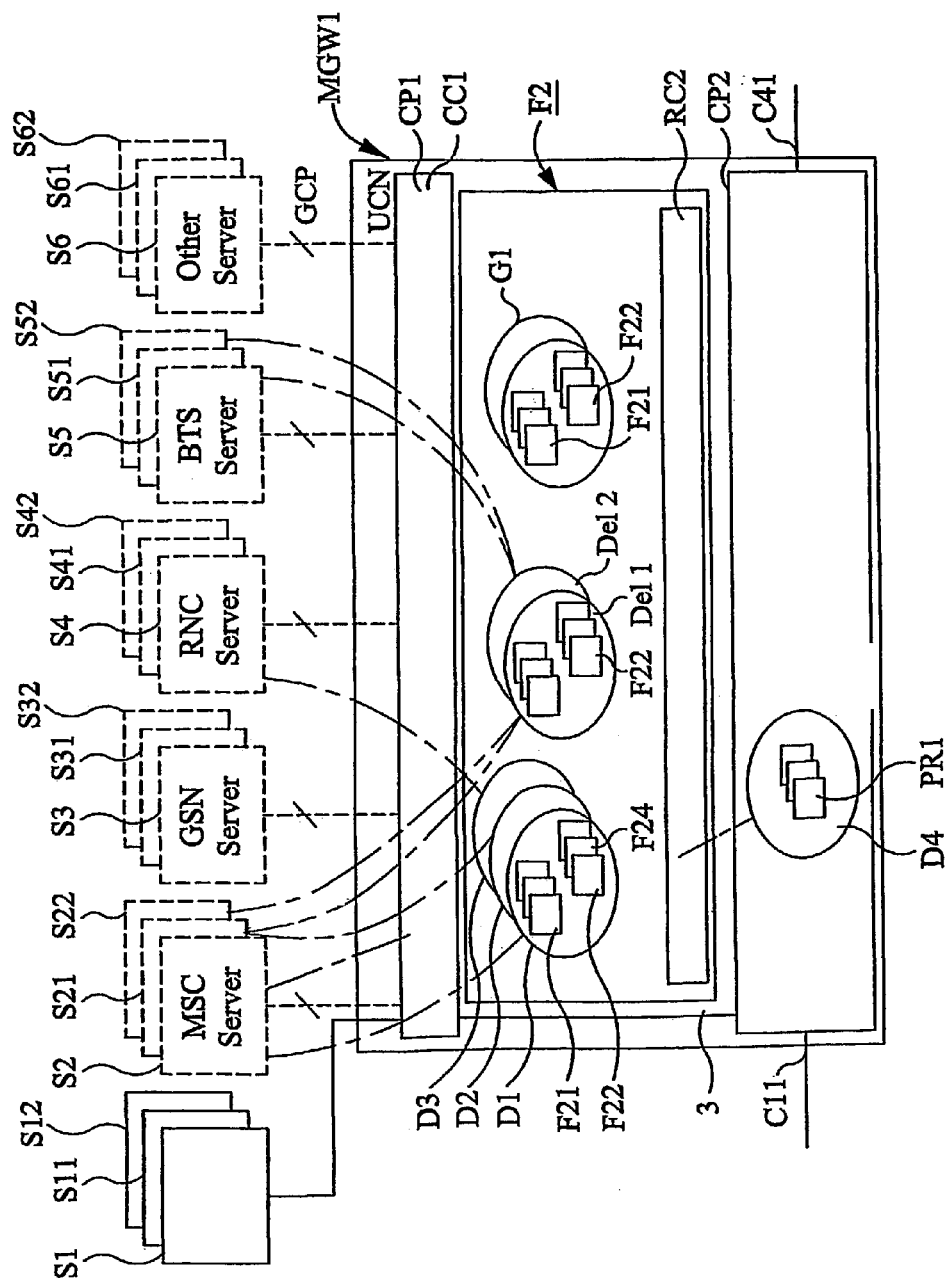
FIG. 5 shows a block diagram of the gateway with its connected servers and resources divided into classes.

With reference to FIG. 5 an example will show the manner in which this classification is utilized in gateway MGW1. The Figure shows a somewhat simplified illustration of gateway MGW1, to which a number of servers are connected in addition to servers S1-S6. The simplification consists in interface box CP2 having been shown as a single unit and in that the first control unit CC1 and signal processing unit CP1 are shown as one single unit. Together with servers S1-S6 servers S11, S12, S21, S22, S31, S32, S41, S42, S51, S52, S61 and S62 are shown. The telefunctions have been regrouped in the Figure for clearly showing the various classes. Regrouping in this manner does not affect the gateway other than that the servers are tied to specific resources by their addresses as will be disclosed below.

The dedicated resources may be found in resource groups D1, D2, D3 and D4, the divided resources may be found in resource groups Del 1 and Del 2, and the common resources may be found in one group G1. As an example of resources in the resource groups it may be stated that resource group D1 comprises codec F21, echo canceller F22, and tone generating function F24. Resource group D4 comprises processor resource PR1 measured for example as megainstructions per second, MIPS. An additional example is that a number of sets of echo canceller F22 also may be found in resource group Del 1 for divided resources and that resource group G1 for common resources comprises sets of codec F21 and echo canceller F22. The various servers have access to resource groups as follows: Server S2 has access to resource groups D1 and D4, server S21 has access to resource group D2, and server S4 has access to resource group D3. Servers S21 and S22 have access to resource group Del 1 and servers S5 and S52 have access to resource group Del 2. All of this has been marked out with dash lines and dot dash lines in the Figure. All of the servers S1-S62 have access to resource group G1 which is not specifically marked in the Figure.

Switch and trunk functions CP21-CP27 can in the same manner be supplied to the resource group in FIG. 5 or can be allotted their own resource groups.

With reference to FIGS. 3 and 4 it has been described how server S2 established a connection from subscriber A1 to gateway MGW1 utilizing telefunctions F21, F22 and F24, respectively. With the distribution of resources which has been mentioned in connection with FIG. 5 server S2 can always reach its own dedicated resources to carry out this connection. If server S3 is to carry out the same connection it must rely on the common resources in resource group G1 to the extent that these resources are available. Should server S2 already have utilized all of its dedicated resources then it can utilize the common resources.

The server that establishes a connection provides its own address to signal processing unit CP1 in gateway MGW1 as is mentioned in the description of FIG. 3. When the server requests the resource in the form of one of the telefunctions the address of the server is forwarded to the second control unit RC2 in FIG. 2. This unit allots the telefunctions and can determine if the server can reach the resource as a dedicated, divided or common resource. The other control unit compares the address of the server with a list, with an example of such list L1 being shown in the form of a table in FIG. 6. The table has three columns 11, 12, and 13, respectively. Column 11 lists various resources which in this example are circuit boards of type 1 and circuit boards of type 2. Column 12 lists various instances of resource which in the example are circuit boards of type 1_1, type 1_2, type 1_3, type 2_1, type 2_2 and type 2_3. In the example these instances of resource are the resource groups which have been mentioned more generally earlier. Column 13 shows a label for the respective instance of resource including information on the class of the instance of resource and the address of the server that can utilize the instance. Circuit board type 1_1 is resource group Del 1, and the label indicates that a shared resource group can be utilized by servers S21 and S22. The case is the same with the remaining instances of resource which are connected to the servers in the manner which is described in connection with FIG. 5.

Figure 6:
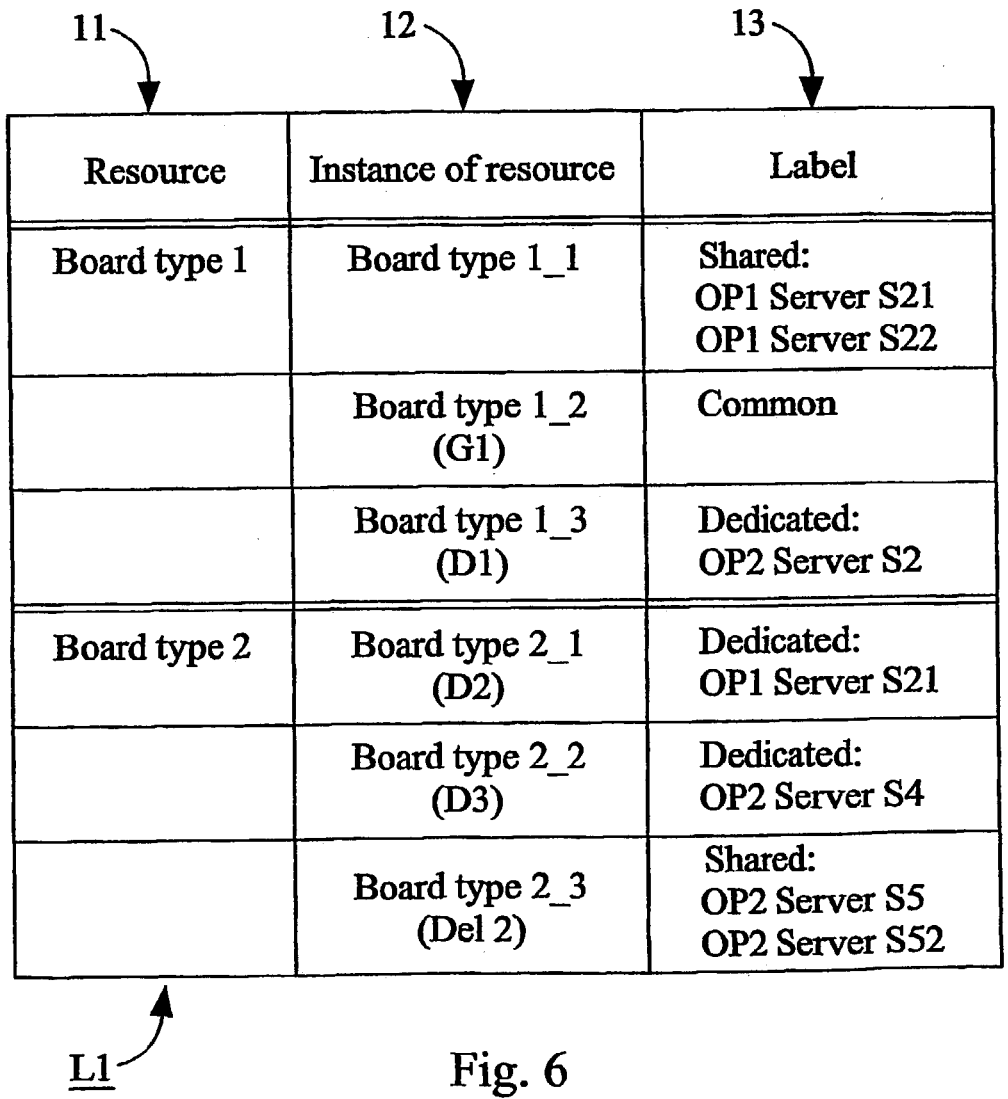
FIG. 6 is a schematic diagram of resources that are divided into classes and the corresponding server addresses.

The embodiment above in FIG. 6 concerns the availability of telefunctions F21-F28. The availability of switch and trunk functions CP21-CP27 is handled in the same manner in gateway MGW1 with the only difference that it now is the third control unit BC3 that handles the functions. This control unit has a table corresponding to the table in FIG. 6 having resource groups and labels and can carry out a comparison between these labels and the address of the server that requests a resource. In this manner the third control unit can determine which resources the relevant server can reach. The processor resources which are utilized for handling the functions, for example processor PR1, can also be utilized in corresponding manner. Processor capacity is always available for server S2 to handle the switch and trunk function CP27.

The embodiment of the invention described above with the resources divided into three classes with different availabilities can be varied in various ways. The number of classes can be reduced to two, for example dedicated and common resources, or else the number of classes can be increased so that a more finely distributed system is achieved. In the example the divided resources were shared by two of the servers, but still more than two servers can share a resource. In the example above the resource groups were various types of circuit boards, but they can be entirely different units on other size levels. Thus, a whole node, for example node MSC1, a receptacle, for example receptacle SR1, a circuit board as in the example above, a switch and trunk function, for example function CP23 or a telefunction, for example message function F25, can be a resource group.

As is described above gateway MGW1 is structured by nodes RNC1, MSC1, IP1 and VX1 from the telecommunication networks N1, N2 and N3. In an alternative, the base stations BS1 and BS2 can also be included in this gateway. The servers for the various nodes have been provided access to the resources of the gateway. The process that is utilized to construct gateway MGW1 with servers S1-S6 and which may be seen in the specification above will now be summarized with reference to FIG. 8a and FIG. 8b.

Figure 8A:
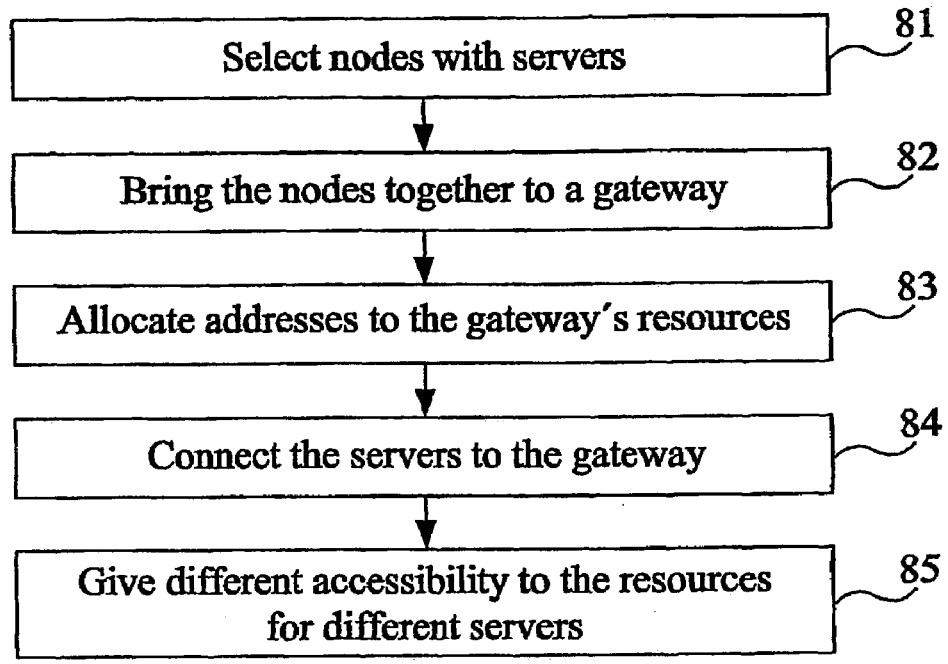
FIG. 8A shows a flow chart for structuring a gateway.

In accordance with FIG. 8a the procedure is initiated by choosing the nodes in telecommunication system TS1 with their servers which are to be included in the gateway, box 81. As indicated in box 82 the nodes are combined into a logical unit, the common gateway MGW1 with its functions CP21-CP27 and F21-F28, its control units CC1, RC2 and BC3 as well as signal processing unit CP1. As indicated in box 83 addresses are allocated to the gateway's resources, for example addresses ADR1, ADR3, ADR11 and ADR21, respectively. As indicated by box 84 the servers are connected to gateway MGW1 through signal processing unit CP1. Box 85 provides different accessibilities to the resources for different servers.

Figure 8B:
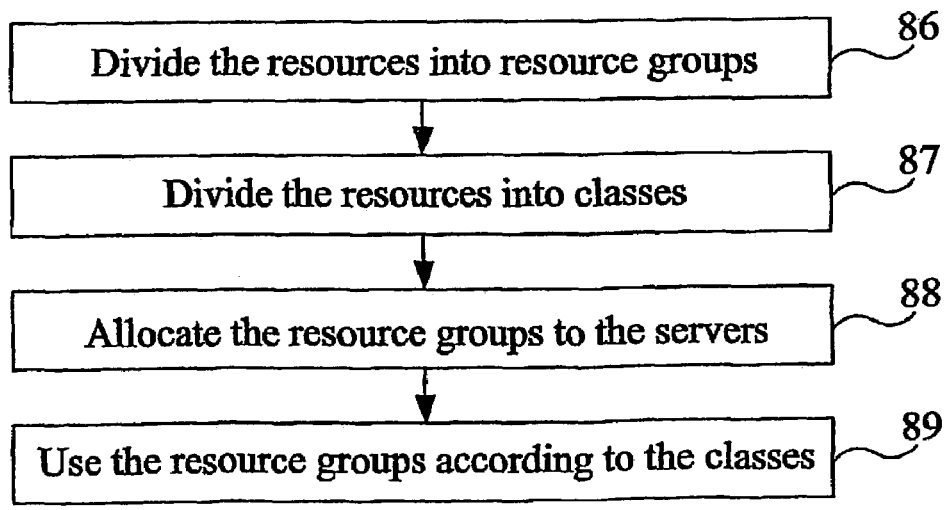
FIG. 8B shows a flow chart for dividing the resources into classes.

FIG. 8b shows a procedure with classification of the resources for creating their various accessibilities. As indicated in box 86 the procedure is initiated by the resources being divided into resource groups, for example resource groups D1, D2, D3, D4, Del 1, Del 2, and G1, respectively. Box 87 indicates that the resource groups are divided into classes, with the classes for example being dedicated, divided and common resources. The classified resource groups are allocated to the servers as indicated in box 88, for example in the manner shown by list L1. As indicated by box 89 the servers utilize the resource groups according to the classes.

The invention claimed is:

1. A telecommunication system with a connecting arrangement, said telecommunication system comprising at least two telecommunication networks of different types, said telecommunication networks on the one hand having nodes determined by the type of the respective telecommunication network for establishing telecommunication connections in the telecommunication system and on the other hand having servers determined by the types of the respective telecommunication networks for controlling said establishing, wherein the nodes comprise resource units having internal resources in the form of functions and processors which are intended for the telecommunication connections which are established in the telecommunication system, wherein:

the nodes are included in a connecting arrangement of the telecommunication system;

the servers are connected to the connecting arrangement of the telecommunication system;

one of the servers which is determined by one of the telecommunication networks is accessible to at least a portion of the resources in the resource units of one of the nodes which is determined by another one of the telecommunication networks; and the resources are divided into resource groups wherein only a portion of the servers are adapted to have access to a predetermined one of the resource groups.

2. The telecommunication system with a connecting arrangement in accordance with claim 1, wherein the nodes also comprise the resource units having transmission and processor resources for handling the mentioned functions.

3. The telecommunication system with a connecting arrangement in accordance with claim 1, wherein only one of the servers has access to a first predetermined group of the resource groups.

4. The telecommunication system with a connecting arrangement in accordance with claim 1, wherein said portion of the servers comprises at least two of the servers which have access to a second predetermined one of the resource groups.

5. The telecommunication system with a connecting arrangement in accordance with claim 1, wherein the resource groups are arranged in classes, wherein the resource groups in a first one of the classes can only be reached by an individual server among the servers.

6. The telecommunication system with a connecting arrangement in accordance with claim 1, wherein the resource groups are arranged in classes, wherein the resource groups in a second class among the classes can be reached by only an individual portion of the servers, a number comprising at least two of the servers.

7. The telecommunication system with a connecting arrangement in accordance with claim 1, wherein at least one of the resource groups comprises a receptacle.

8. The telecommunication system with a connecting arrangement in accordance with claim 1, wherein at least one of the resource groups comprises a circuit board.

9. The telecommunication system with a connecting arrangement in accordance with claim 1, wherein at least one of the resource groups comprises one of the functions which is intended for the telecommunication connections.

10. A process in a telecommunication system with a connecting arrangement, said telecommunication system comprising at least two telecommunication networks of different types, said telecommunication networks on the one hand having nodes determined by the type of the respective telecommunication network for establishing telecommunication connections in the telecommunication system and on the other hand having servers determined by the types of the different telecommunication networks for controlling said establishing, said nodes comprising resource units having internal resources in the form of functions which are intended for the telecommunication connections which are established in the telecommunication system, wherein the process comprises the following steps:
interconnecting the nodes and the connecting arrangement of the telecommunication system;
connecting the servers to the connecting arrangement of the telecommunication system;
preparing access for one of the servers to at least a portion of the resources in the resource unit of one of the nodes, said server being determined by one of the telecommunication networks and said node being determined by another one of the telecommunication network;
dividing the resources into resource groups; and
preparing access to a predetermined one of the resource groups for only a portion of the servers.

11. The process in a telecommunication system with a connecting arrangement in accordance with claim 10, wherein the process comprises the following steps:
dividing the resource groups into classes; and
utilizing the resource groups in a first one of the classes of only an individual respective one of the servers.

12. The process in a telecommunication system with a connecting arrangement in accordance with claim 10, wherein the process comprises the following steps:
dividing the resource groups into classes; and
utilizing the resource groups in a second one of the classes, with the mentioned portion of servers including at least two of the servers.

* * * * *